April 29, 1930. H. W. AVERY 1,756,167
DEVICE ADAPTED TO BE SCREWED ONTO PIPES OR RODS
Filed Feb. 15, 1926
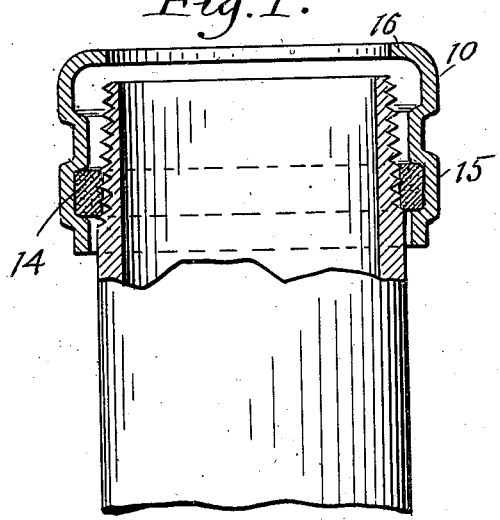
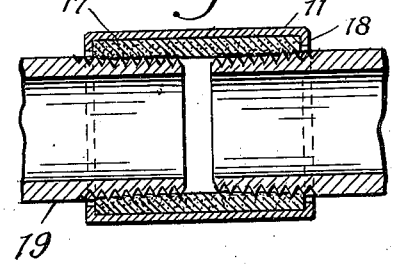
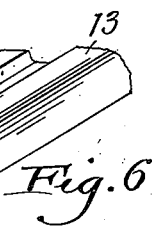
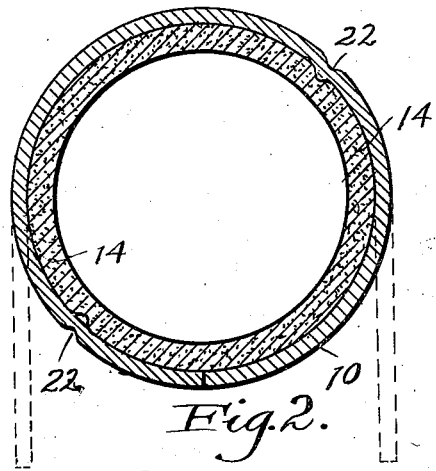
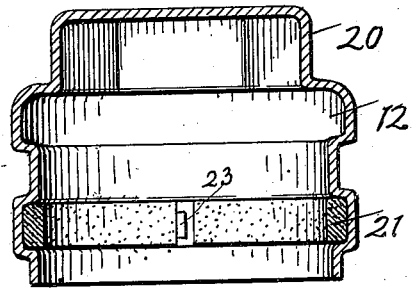
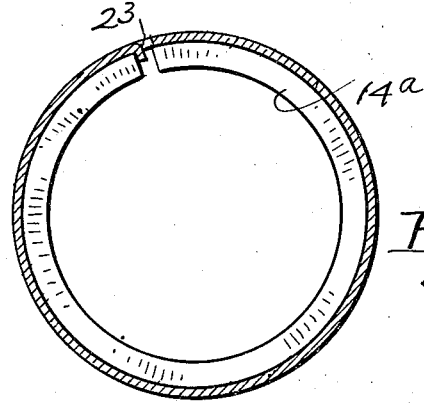
Inventor
Henry W Avery
By Kwis Hudson & Kent
Attorneys Patented Apr. 29, 1930

1,756,167

UNITED STATES PATENT OFFICE

HENRY W. AVERY, OF CLEVELAND, OHIO

DEVICE ADAPTED TO BE SCREWED ONTO PIPES OR RODS

Application filed February 15, 1926. Serial No. 88,202.

This invention relates to devices adapted to be screwed onto threaded pipes or rods such as thread protectors, pipe couplings and caps.

The principal object of the present invention is to provide a device of this character which can be manufactured inexpensively and which is useful for many purposes such as those mentioned, the invention having particular utility for use where a firm or leak-proof connection is not required.

It is a feature of the present invention that the device includes a sleeve-like member carrying on the interior an unthreaded but sufficiently soft ring or sleeve that when the device is screwed onto the threaded pipe or rod it will have threads cut therein so as to have threaded engagement with the threads of the pipe or rod and thereby form the union between the device and the threaded member.

The invention may be further briefly summarized as consisting of certain novel details of construction and combinations of parts which will be described in the specification and set forth in the appended claims.

In the accompanying drawings I have illustrated several forms and adaptations of my invention of which Fig. 1 is a view partly in elevation and partly in section, showing a pipe provided with a thread protector formed in accordance with my invention; Fig. 2 is a cross sectional view of the same, illustrating one way in which the sleeve may be formed and one way of preventing relative rotation between the sleeve and the relatively soft thread receiving member on the interior; Fig. 3 is a somewhat similar view showing a modification; Fig. 4 is a sectional view showing my invention embodied in a pipe coupling applied to the adjacent ends of two pipes; Fig. 5 is a sectional view of a cap formed in accordance with my invention; Fig. 6 is a perspective view of the length of rolled stock of which the sleeve of the protector or coupling may be formed.

Referring now to the drawings, the device in whatever form it is made, or for whatever purpose the invention is applied, includes an outer annular or a substantially annular sleeve-like member which in Fig. 1 which shows the invention embodied in a thread protector, is indicated at 10. When the invention is applied to a pipe coupling as illustrated in Fig. 4, this sleeve may assume the form indicated at 11, and when the invention is applied to a cap for screwing onto a threaded pipe or rod, the sleeve may assume a form such as indicated at 12 in Fig. 5. In Fig. 1 and Fig. 5 the sleeve is shown as provided with undulations or corrugations, but the particular contour illustrated is unessential to the invention. The sleeve 11 of Fig. 4 is shown as plain or smooth exteriorly, but the contour or cross sectional shape may be other than illustrated in this figure.

These sleeves, whether adapted for a protector, a coupling or a cap, may be formed in different ways, for example; they may be cast, drawn or may be formed into circular or annular shape from rolled straight stock such as illustrated at 13 in Fig. 6. The sleeve 10 of Fig. 2 may be assumed to be formed in this manner. Sleeves formed in the manner just stated have the advantage that under extreme pressure of the inner thread engaging member it may expand and allow the device to be screwed the full distance on a pipe or rod.

There is applied to the interior of the sleeve an unthreaded but thread receiving member formed of sufficiently soft material that when the device is screwed onto a threaded pipe or rod the threads of the latter will cut their way into this member so as to form the threaded engagement therewith. As illustrations of materials which might be employed for this purpose I might mention fibre, leather, certain forms of rubber, soft metal and various compositions.

This relatively soft thread receiving member is generally seated in an annular groove on the interior of the sleeve and is held from rotation with respect to it. However, it is not connected to it except it is suitably seated therein and held from rotary movement with respect thereto. It may be termed a floating member.

In Fig. 1, illustrating the protector, the relatively soft thread receiving member is indicated at 14. In this instance the sleeve is provided with corrugations indicated at 15, and the outer end of the sleeve is curved inwardly as indicated at 16 to protect the end of the pipe. This forms internal and external grooves, and the thread receiving member 14 is seated in one of the internal grooves. In the coupling illustrated in Fig. 4 the relatively soft thread receiving member is indicated at 17 and it is seated in a groove of the sleeve 11 which is, in this instance, formed by inwardly flanging the ends of the sleeve 11 as indicated at 18. In this instance the length of the thread receiving member 17 is considerably longer than that of the corresponding member of the pipe protector shown in Fig. 1, its length being sufficient that it may engage the threads of the two pipes 19 to be coupled.

The sleeve 12 of the cap shown in Fig. 5 is provided with internal and external corrugations quite similar to those illustrated in Fig. 1, but one end of the sleeve is closed as illustrated at 20 as is customary with caps for pipes and rods, and the closed end may, if desired, be shaped to accommodate a wrench. The relatively soft thread receiving member is indicated at 21, the same being seated in one of the internal grooves of the sleeve 12, and in this instance it is shown relatively short as in the pipe protector of Fig. 1, but it may be lengthened out, if necessary, so as to engage a longer section of the threaded pipe or rod onto which the device is adapted to be screwed.

These relatively soft thread receiving members may be continuous or complete annuli as indicated in Fig. 2, in which event they may be conveniently formed by cutting them into suitable lengths from a sleeve or pipe-like member. Or they may be formed from flat stock and formed into annular shape as indicated at 14ª in Fig. 3 and as indicated also in Fig. 5.

As previously stated, it is important that the outer sleeve and the inner relatively soft thread receiving member be held against relative rotation. These parts may be fastened together against relative rotation in many different ways, as by indenting the sleeve as indicated at 22 in Fig. 2, or by driving down a tongue or shoulder such as shown at 23 in Fig. 3, which shoulder, in this instance, is in the gap between the adjoining ends of the relatively soft thread receiving member 14ª. Either of the methods mentioned above of forming the interlock between the outer sleeve and inner thread receiving member may be utilized when the sleeve is formed of rolled or drawn metal. Other ways of forming the interlock may be employed, as by utilizing a cast stop shoulder or lug in the event the sleeve is cast, or by means of a locking pin or screw.

In applying the device, whether in the form of a protector, cap or coupling, it is screwed onto the threaded member in the usual way and in so doing threads are formed or cut in the relatively soft thread receiving member, the device thereby feeding along the threaded member as the former is rotated or screwed onto the latter just the same as if it were provided on the interior with threads matching those of the threaded member. When the device is screwed in place it is found that there is a sufficiently tight union with the threaded member to answer the requirements for many purposes. It is particularly serviceable as a pipe protector or as a cap inasmuch as there is no likelihood that the device will be jarred off by vibration during shipment since the thread receiving member on the interior of the metal sleeve serves as a cushion between the threaded member and the sleeve.

This device also has utility as a pipe coupling for certain purposes, especially when the joined pipe sections are employed as a conduit for wires and the like and are not subjected to material internal pressure.

Having thus described my invention, what I claim is:

1. A device adapted to be screwed onto a threaded pipe or rod comprising an expansible sleeve formed from a strip of corrugated stock rolled into annular shape, an unthreaded ring seated in one of the circumferential grooves formed by the corrugations of said stock and constituting the thread engaging part of the device, said ring being held from rotation relative to the sleeve and formed of relatively soft material into which a thread may be cut when the device is screwed onto the threaded pipe or rod.

2. A device adapted to be screwed onto a threaded pipe or rod comprising an expansible sleeve having an internal groove and an unthreaded thread engaging ring formed of relatively soft material seated in said groove and held from rotation relative to the sleeve, said ring being adapted to hold said sleeve in position over the threads to be protected but out of contact therewith.

3. A device adapted to be screwed onto a threaded pipe or rod comprising an expansible sleeve formed from a section of stock having corrugations formed therein, the corrugations of said stock providing an internal annular groove in said sleeve, and a thread engaging member seated in said groove, said member being held from rotation relative to the sleeve and being adapted to hold said sleeve in position over the threads to be protected but out of engagement therewith.

In testimony whereof, I hereunto affix my signature.

HENRY W. AVERY.